United States Patent

[11] 3,619,034

[72] Inventors Motoi Yagi
Zushi-shi;
Yasuo Takemura, Kawasaki-shi, both of Japan
[21] Appl. No. 4,543
[22] Filed Jan. 21, 1970
[45] Patented Nov. 9, 1971
[73] Assignee Tokyo Shibaura Electric Co., Ltd.
Kawasaki-shi, Japan
[32] Priorities Jan. 25, 1969
[33] Japan
[31] 44/6120;
Jan. 27, 1969, Japan, No. 44/6352

[54] COLOR SEPARATING OPTICAL DEVICE

7 Claims, 4 Drawing Figs.

[52] U.S. Cl. .... 350/173, 178/5.4 ST
[51] Int. Cl. .... G02b 27/14, H04n 9/08
[50] Field of Search .... 350/171, 173; 178/5.4 ST

[56] References Cited
UNITED STATES PATENTS

| | | | |
|---|---|---|---|
| 2,917,574 | 12/1959 | Toulon | 178/5.4 ST |
| 3,300,580 | 1/1967 | Takagi et al. | 178/5.4 ST |
| 3,502,799 | 3/1970 | Watanabe | 178/5.4 ST |
| 3,524,014 | 8/1970 | Watanabe | 178/5.4 ST |
| 3,526,706 | 9/1970 | Watanabe | 178/5.4 ST |

*Primary Examiner*—David Schonberg
*Assistant Examiner*—John W. Leonard
*Attorney*—Flynn & Frishauf ABSTRACT: A color-separating optical device comprising a beam splitter for separating a light coming from an image pickup lens into a portion passing straight through said beam splitter and a remaining portion reflected thereby, a color stripe filter on which there is formed an image of reflected light, a relay lens for receiving a light from said stripe filter and a means for reflecting a light from said relay lens in the same direction as that which previously passed straight through said beam splitter, thereby obtaining two parallel beams of light, and a lenticular lens interposed between said color stripe filter and beam splitter so as to reduce optical resolution conducted in a direction perpendicular to the stripes of said color stripe filter.

COLOR SEPARATING OPTICAL DEVICE

The present invention relates to a color-separating optical device of simple arrangement. Such type of device heretofore used in a simple color television camera means involves two image pickup tubes, one of which generates luminance signals and the other of which sends forth color signals.

To this end, there is required a color-separating optical device which is capable of efficiently separating a light from a camera lens and transmitting said divided beams of light to two image pickup tubes respectively. However, said color-separating optical device had the drawback that it was of complicated arrangement and presented difficulties in adjustment due to requirement of various kinds of lenses, prisms and color filters. Further since the luminance signal pickup tube and color signal pickup tube were separately provided, it was difficult to maintain them in an exact relative position. There were encountered further handicaps that once there was replaced a used color-separating optical system, the changed relative position of the luminance signal pickup tube and color signal pickup tube would most likely be displaced from that which was fixed before replacement, unless it was properly adjusted, so that the interchangeability of parts of said optical system was reduced with the resultant low productivity.

With an ordinary system of separating luminance and color signals if luminance signals derived from a high-frequency band are taken out, it is considered sufficient to take out color signals having a relatively low frequency. Accordingly, color signals are taken out in the form of multifrequencies or that of multiphases and multiamplitudes using a single image pickup tube and a color stripe filter.

To this end, it is necessary to conduct optical defocusing in order to remove the moiré phenomenon or wavy appearance of an optical image occurring on a color stripe filter. It is a customary practice to reduce the resolution by adjusting the focus of a lens to a point a little ahead of a foreground object. With television signals, there occurs the disadvantage that while the resolution in a horizontal direction has only to be reduced, that in a vertical direction is also unnecessarily decreased. To eliminate such inconvenience, there is proposed the use of a lenticular lens (a lens assuming such a shape as would appear when a plurality of narrow columnar lenses semicircular at one end were integrally formed into a single lens.) However, it is usually difficult to place a lenticular lens at a suitable position. Accordingly, where such lens is to be used, the passage of light is elongated using an extra relay lens or light from said lens is reflected a number of times. However, such method leads to flares and consequently increased loss of light, moreover requiring complicated adjustment of an optical axis, so that it is unadapted for use in a simple television camera.

The present invention relates to a color-separating optical device wherein light from an image pickup lens is efficiently separated in two parts in a vessel integrally formed with said device by a beam splitter which causes one portion of said light to pass straight in a forward direction and the remaining portion to be reflected in a different direction, the part of light proceeding in the forward direction directly enters a luminance signal pickup tube through a first opening and the part of light reflected in the different direction makes its formation on a color stripe filter, the light passing through said filter is conducted through a relay lens, and deflected in the direction parallel to the said light advancing straightly. The light reflected is introduced into a color signal pickup tube through a second opening, and there is further provided between said beam splitter and color stripe filter a lenticular lens so as to reduce the optical resolution conducted in a perpendicular direction to the stripes of said color stripe filter.

This invention can be more fully understood from the following detailed description when taken in connection with the accompanying drawings, in which.

Figure 2:
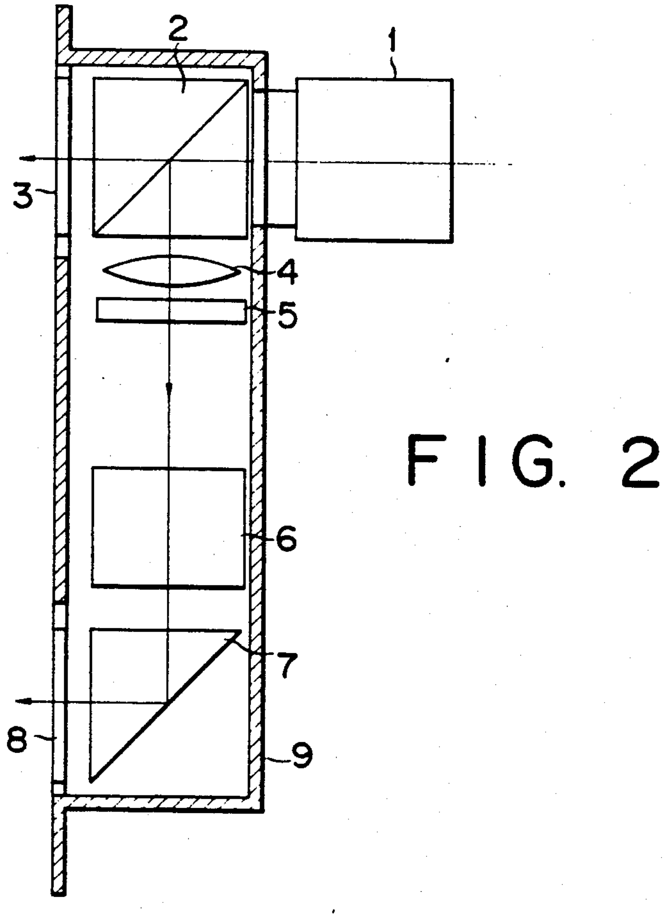
FIG. 2 is a cross-sectional view of the device of FIG. 1.

Referring to FIG. 2, light from an image pickup lens 1 is separated by a half prism 2. The term half prism is used herein to denote a beam-splitting prismatic element. One portion of said light is conducted to a luminance signal pickup tube (not shown) through a luminance correction color filter 3 and makes its formation on the photoelectric surface of said tube. The other portion proceeds from said half prism 2 and first makes its formation in the proximity of a field lens 4. After leaving a color stripe filter 5, said formation light passes through a relay lens 6 which is used in again concentrating the image of a foreground object obtained from said color stripe filter 5 on the photoelectric surface of a color pickup tube (not shown). The passage of said reformation light is so deflected by a reflection prism 7 to progress in the same direction as the light entering said luminance signal pickup tube through an infrared ray cut correction color filter 8 to make formation on the photoelectric surface of said tube.

In this case, there are linearly arranged on the same optical axis said image pickup lens 1, half prism 2 and luminance signal pickup tube. On the other hand, there are also linearly positioned on the same axis said half prism 2, field lens 4, color stripe filter 5, relay lens 6 and reflection prism 7.

Figure 1:
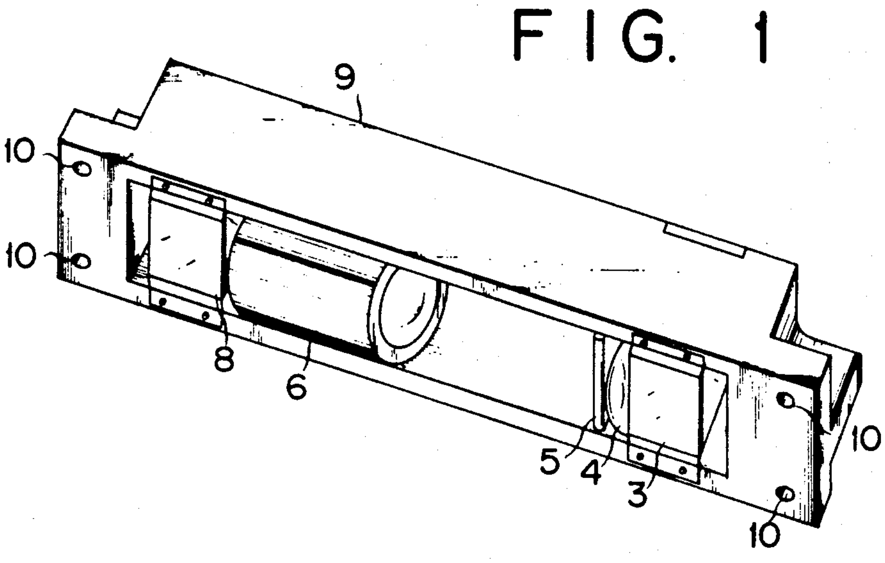
FIG. 1 is a perspective view of a color separating optical device according to the present invention.

The aforementioned arrangement enables the images of luminance and color signals of a foreground object formed respectively on the same surface and consequently both luminance and color signal pickup tubes to be disposed on the same plane and parallel to each other. Accordingly, an optical device having the aforementioned arrangement can be conveniently received in a case 9 shown in FIGS. 1 and 2. This case is used to shield light and in supporting other optical parts and is so designed as to be fitted to the body of a camera by holes 10 formed on both longitudinal sides and also to allow an image pickup lens 1 to be fitted on the right side and two images to be produced on the opposite side. Though of such simple boxlike construction, said case enables external light to be fully shut off. Further said image pickup tube can be moved separately from said case.

Outputs from both luminance and color signal pickup tubes are composed by electrical means to obtain color television signals. The technology of conducting this operation is already known and description thereof is omitted.

The present invention provides a color-separating optical device comprising a rectangular vessel for supporting lenses, to one end of which is detachably attached an image pickup lens, a first mirror disposed on the optical axis of said image pickup lens within said vessel for causing one portion of light from said image pickup lens to proceed straight and the remaining portion to take a passage parallel to the longitudinal direction of said vessel, a first opening perforated on one side of said vessel so as to draw said straight light passing said mirror outside thereof, a field lens located near the point within the vessel at which there is focused the light caused by said first mirror to travel parallel to the longitudinal direction of said vessel, a color stripe filter positioned on the optical axis of said field lens defined within said vessel, a relay lens disposed in the passage of light leaving said filter, a second mirror for so deflecting the light leaving said relay lens as to progress parallel to the light passing through said first opening, a second opening provided on the same side as said first opening so as to conduct the light from said second mirror outside of the vessel.

Figures 3, 4:
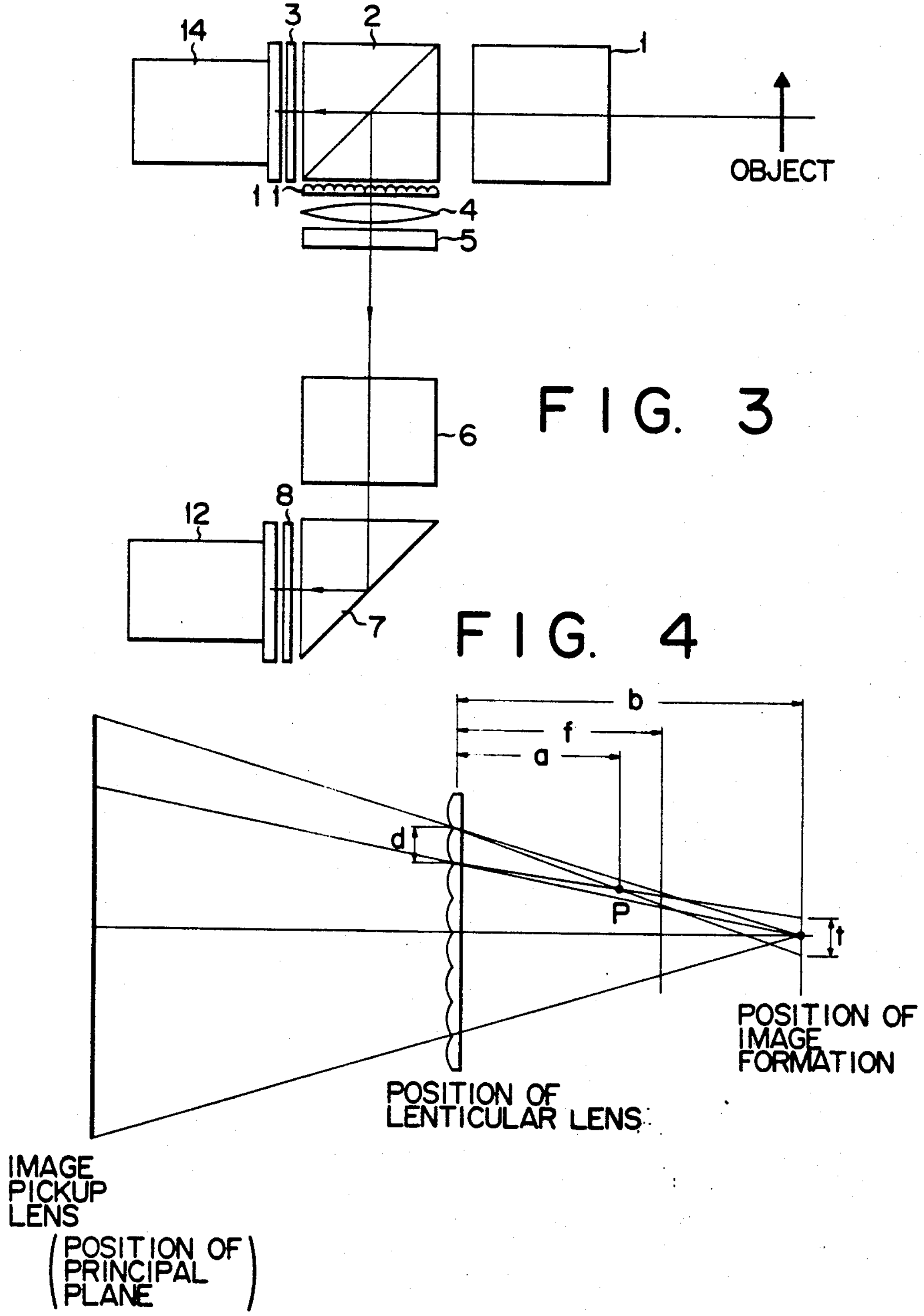
FIG. 3 is a cross-sectional view of the device of FIG. 2 according to another improved embodiment of the invention.
FIG. 4 illustrates why the resolution is reduced with a lenticular lens.

FIG. 3 represents an improvement of the device shown in FIG. 2. Light from the image pickup lens 1 is separated in two by the half prism 2. One portion of said light is conducted through the color filter 3 to the photoelectric surface of a luminance signal pickup tube 14 to be focused thereon.

The remaining portion of light from said image pickup lens 1 is reflected by said half prism 2, conducted through an additionally installed lenticular lens 11, gathered by the field lens 4 to be focused by the color stripe filter 5 and, after passing through the relay lens 6, reflection prism and color stripe filter 5, brought to the photoelectric surface of a color signal pickup tube 12.

Said lenticular lens 11 is disposed close to said half prism 2, and the relay lens 6 is so arranged as to allow a color stripe image to be exactly focused on the photoelectric surface of said color pickup tube 12, substantially preventing any stripe pattern of light passing through said lenticular lens from appearing on said photoelectric surface. This arrangement permits the resolution of the image of a foreground object in a horizontal direction to be decreased without reducing resolution thereof in a vertical direction, thereby preventing the occurrence of the aforementioned moiré phenomenon or wavy pattern of the image of a foreground object obtained on the color stripe filter, and also allowing the degree of resolving color signals to be optically reduced. The reduction of the degree of resolving the image of a foreground object by said lenticular lens 11 is presented in FIG. 4.

Now let the following factors be designated by characters indicated opposite thereto.

Focal length of lenticular lens —$f$

Distance between lenticular lens and photoelectric surface of image pickup tube —$b$ Distance from lenticular lens to a point at which there is focused an image—$a$ Pitch of lenticular lens—$d$ Extent of blurring of an image on photoelectric surface caused by lenticular lens—$t$ Let us consider by reference to FIG. 4 an image produced by a given lenticular lens. Light to be projected on a screen is first focused at point P by the action of the convex portion of said lenticular lens and then so scattered as to have a width $t$ on the screen.

The relationship of the factors *300 μb* and $f$ may be expressed as follows according to the formula of lenses:

$$1/f=1/a-1/b$$

Since $a$ is a function of $f$ and $b$, there results the following equation:

$$a=fb/f+b$$

As apparent from FIG. 4, there prevails a relationship of similarity.

Thus, $d/a=t/b-a$.

Therefore, with the extent of blurring designated as $t$, $t=d(b-a)/a$

The factors $d$, $f$ and $b$ were experimentally determined approximately as follows:

$d$=80 μ

$f$=300 μ

$b$=5 mm.

Accordingly, horizontal resolution could be limited to about 500 kHz. In this case the practiced plane of a vidicon had a horizontal length of 8.8 mm. As mentioned above, the optical device of the present invention comprises a mirror for separating light from an image pickup lens into one portion travelling along a first passage in the direction of the optical axis of said lens and the remaining portion proceeding along a second passage perpendicular to the first mentioned passage and a lenticular lens interposed between said mirror and color stripe filter for reducing the optical resolution of an image in a perpendicular direction of a color stripe filter as is practised in a device having a lenticular color stripe filter disposed in the passage of color signals, so that the present invention displays the following favorable effects.

Since two images of a foreground object formed of luminance and color signals respectively are juxtaposed vertically or horizontally in substantially the same plane, two luminance and color signal pickup tubes can be fitted to the same surface of a substrate. This arrangement assists in the miniaturization of, for example, a color television camera. In fact, however, there is additionally mounted a deflecting coil on the same substrate so that the positions of the images of said two tubes are exactly adjusted. The interval between said two tubes is fixed, optical parts for color-separating system are replaceable and various parts of the device are interchangeable, thus resulting in the increased productivity of said device. Moreover, since the aforesaid two images of a foreground object are focused in the same plane, they can be transposed to a photographic film as they are. Use of a halfprism allows the focal length of an image pickup lens to be extended. It is possible to reduce only horizontal resolution without decreasing vertical resolution, prevent the occurrence of the moiré phenomenon or wavy pattern of the image of a foreground object obtained on a color stripe filter, and even in this case obtain a highly resolved luminance image in both vertical and horizontal directions.

With the optical device of the present invention, light entering a luminance signal pickup tube is directly focused without passing through a relay lens, so that there is obtained a highly resolved image. Generally, use of a relay lens leads to the occurrence of flares and consequently loss of light and decreased resolution. However, since the luminance signal pickup tube according to the present invention does not require a relay lens, it can be made compact and moreover produce a highly resolved image. Generally, a color image does not require so high a resolution as a luminance image, so that the relay lens used for the color image need not be of such complicated construction as is used in advanced functions. According to this embodiment, the color signal pickup tube only needs a relay lens formed of about eight lenses. Consequently, the device of the present invention as a whole has the advantage of reducing flares and consequently loss of light.

As mentioned above, the present invention allows a color-separating optical device and two luminance and color signal pickup tubes to be positioned on the same substrate. Since all these three members always act in a body, and their relative optical positions are not displaced even under external mechanical stresses or deforming forces, there is always obtained a stable image. Unless, however, these members are stirred exactly at the same time, it is likely that under the weight of various pickup lenses and tubes a projected image will be inclined or a focusing point will be shifted with the result that with a two-tube-type camera, there will appear a color displacement to reduce the quality of an image produced.

In the foregoing embodiment, the color filter 3 may be disposed near the color stripe filter 5. In short, the former filter 3 may be positioned anywhere between the half prism 2 and color pickup tube. To improve light penetration, it is also possible to gather these filters 3 and 5 at one place instead of arranging them separately from each other, put the filter 3 together with the half prism 2 on its exit plane of reflected light, or coat a relay lens with a film matching the wavelength of light used.

Light from a first image pickup tube need not be separated in equal portions, but may be divided in any desired ratio, as generally practised. Since reflected light is appreciably lost while passing through relay lenses and filters, common practice is to set the degree of penetration at about 30 percent and the degree of reflection at about 70 percent. Obviously, the reflection prism may be substituted by a reflection mirror.

It is not necessary to restrict the use of the aforesaid two pickup tubes to the pickup of luminance and color signals. But these tubes may assume, for example, the properties of exhibiting green and red colors respectively, depending on an optical system whereby there are picked up color images.

The photoelectric conversion element is not limited to an image pickup tube, but may consist of a plain photographic film.

For example, if two images of a foreground object obtained by separating light therefrom in two parts are previously photographed on a plain movie film in a juxtaposed relationship, their simultaneous projection will produce a color image. Even where there is used a solid image pickup device whose photoelectric conversion element consists of a silicon array prepared from juxtaposed silicon photo diodes, there is also obtained a color image similarly as the aforementioned photoelectric device.

What is claimed is:

1. A color-separating optical device comprising:

an elongated housing 9 having longitudinal side surfaces;

an image pickup lens 1 removably mounted to the end portion of one of said longitudinal side surfaces of said housing 9;

a beam-splitting prism 2 disposed on the optical axis of the image pickup lens 1 and within said housing 9 for passing one portion of light from the image pickup lens straight in a forward direction, and for reflecting the remaining portion thereof along an optical path parallel to the longitudinal direction of said housing 9;

a first window provided in said housing 9 for taking out of said housing 9 the light passed straight forward by said prism 2;

a field lens 4 located within said housing 9 and receiving said light reflected by said prism 2;

a color stripe filter 5 positioned within said housing 9 on the optical axis of said field lens 4;

a relay lens 6 positioned within said housing 9 on the optical axis of said field lens 4;

a reflector 7 located within said housing 9 to reflect the light from said relay lens 6 in the same direction as said light passed straight forward by said prism 2; and a second window in said housing 9 provided in the same plane as that of said first window for taking out of said housing the light reflected by said reflector 7.

2. The optical device according to claim 1 wherein said housing 9 is rectangular.

3. The optical device according to claim 1 wherein said first window includes a first color filter 3.

4. The optical device according to claim 1 wherein said first and second windows include first 3 and second 8 colors filters, respectively.

5. The optical device according to claim 1 wherein said image pickup lens 1 is located outside of said housing 9.

6. The optical device according to claim 1 including a lenticular lens 11 interposed between said prism 2 and said field lens 4.

7. The optical device according to claim 6 wherein said second window includes a second color filter 8.

* * * * *